United States Patent [19]
Slonim et al.

[11] Patent Number: 5,929,749
[45] Date of Patent: Jul. 27, 1999

[54] SYSTEM FOR IMPROVED COMMUNICATION AND CONTROL OVER POWER LINES

[76] Inventors: Michael Slonim, 33 Tzelim, Meitar, Israel; Eugene Paperno, 34 Zvia and Izhak, 84333 Beer-Sheva, Israel

[21] Appl. No.: 08/969,564

[22] Filed: Nov. 13, 1997

[51] Int. Cl.$^6$ .................................................. H04M 11/04
[52] U.S. Cl. ............................... 340/310.01; 340/310.03; 340/310.07
[58] Field of Search ....................... 340/310.01, 310.03, 340/310.07; 307/140, 38, 141.4

[56] References Cited

U.S. PATENT DOCUMENTS

| | | | |
|---|---|---|---|
| 3,946,243 | 3/1976 | Anderson et al. | 307/140 |
| 4,540,875 | 9/1985 | Buttolph, III | 340/310.01 |
| 5,430,430 | 7/1995 | Gilbert | 340/310.01 |
| 5,694,342 | 12/1997 | Stein | 364/572 |

Primary Examiner—Jeffery A. Hofsass
Assistant Examiner—Julie B. Lieu
Attorney, Agent, or Firm—Mark M. Friedman

[57] ABSTRACT

A system is provided for improved communication and control over local power lines, which eliminates the problems caused by low impedance of the power main and the wideband noise and interference normally present there. The system provides for a means of disconnecting the local power lines from the power main by automatic switches during the brief time when communication is to take place. The system consists of a system controller and one or more information sources. The system controller activates the automatic switches as required and periodically initiates communication and control over the local power lines, and the information sources transmit data to the system controller under its command. A low-cost, efficient power arrangement for the system controller is also provided which utilizes a current source and a set of loads connected in series, each load optionally having an automatic shunt for turning it on or off.

16 Claims, 7 Drawing Sheets

SYSTEM FOR IMPROVED COMMUNICATION AND CONTROL OVER POWER LINES

FIELD AND BACKGROUND OF THE INVENTION

The present invention relates to a system for communication and control, and, more particularly, to a system for communication and control utilizing power lines.

The advantages of being able to transmit and receive communication and control signals over power lines are well-known, and currently a number of devices for communication and control over power lines are commercially available for residential use. The present application uses the term "home communication and control system" to denote such a system of such devices, and uses the term "communication and control signal" to denote a detectable low-energy electrical change which conveys information for measurement or command. The present application uses the term "power main" to denote a primary circuit carrying electrical power from the utility, and uses "local power line" to denote a tributary electrical power circuit, either new or existing, which serves to connect one or more independent loads to a power main. The present application uses the term "leg" to denote a branch of an electrical power circuit. The present application uses the term "sensor" to denote any device whose electrical characteristics vary in a known manner according to the physical and/or chemical state of its environment. The purpose of sensors is to enable the measurement of external quantities in electrical terms. Examples of sensors include, but are not limited to, transducers of temperature, light, humidity, magnetic field, pressure, fluid flow, sound, pH, smoke density, radioactivity, and other physically measurable quantities. The electrical characteristics of sensors which vary include, but are not limited to, resistance, frequency, voltage, current, and other such electrical properties. The communication and control effected by a home communication and control system is sensing of one or more conditions, and in response to those conditions, the control of one or more electrical loads, which include, but are not limited to apparatus such as water heaters, lighting, space heaters, ventilators, and air conditioners, humidifiers, dehumidifiers, home appliances, security systems, and the like. The present application uses the term "load" to denote an electrical load.

The principal advantages of home communication and control systems are those of convenience, flexibility, and low installation cost. First of all, no additional wiring is needed for communication and control of lighting, heating, ventilating, and air conditioning, home appliances, security systems, and the like. Thus, the devices can easily and inexpensively be retrofit into older homes. Secondly, the component devices of home communication and control systems can be conveniently located anywhere there is an electrical power main, to provide more design and layout options, and they may be moved from place to place as needed. Home communication and control systems offering continuous communication over power lines include those available from National Semiconductor (LM1893/2893), SGS Thomson (ST7537), Philips (TDA5051), and also from other semiconductor and consumer electronics manufacturers.

Furthermore, widespread interest in transmitting information over power lines is seen in the international standards which have been established for this, including the European CENELEC EN 50065 standard for power line communication.

Unfortunately, home communication and control systems suffer from performance problems related to the use of a power main to transmit signal-level energies. First, a power main represents a very low impedance signal sink, typically several Ohms, and this causes a serious loss of signal strength between the transmitter and receiver circuits. Another problem is related to the high wideband noise present on power mains. This noise can interfere with intended communications and cause spurious signals to be received. Still another problem arises from conflicts between similar systems in nearby locations which share a power main. These problems adversely affect the reliability of home communication and control systems and diminish their value, even in non-critical residential applications. Additional disadvantages of present-day home communication and control systems include their functional complexity and relatively high price of their component devices.

Many different configurations of communication circuits utilizing power lines have been made. For example, U.S. Pat. No. 3,500,132 to Garrett (hereinafter referred to as "Garrett") discloses a scheme for utilizing a single pair of electrical lines to transmit both power and information by interrupting the power according to the information to be transmitted. U.S. Pat. No. 3,909,821 to Jagoda et al. (hereinafter referred to as "Jagoda") discloses a scheme for transmitting audio information over power lines by utilizing filters to reject the 60 Hz power frequency. U.S. Pat. No. 4,031,528 to Harrison (hereinafter referred to as "Harrison") discloses a transponder for sending digital data over power lines by encoding the information in a unipolar potential over the power lines, whose frequency is a multiple of the power line frequency. U.S. Pat. No. 4,348,582 to Budek (hereinafter referred to as "Budek") discloses apparatus for transmitting digital information over power lines by causing a brief near short-circuit condition to occur, and apparatus for receiving this information by sensing the loss of voltage. U.S. Pat. No. 4,642,637 to Baer (hereinafter referred to as "Baer") discloses a method for transmitting data over power lines by switching in a load to generate current signals representing the data.

All of the innovations mentioned above are concerned with methods of representing information so that it may be transmitted over power lines. With the exception of Garrett, all of them can utilize existing power lines to transmit information. Garrett, however, discloses an arrangement whereby the "power lines" are usable only to supply power to the transmitting device, and cannot be used, for example, to power an independent load. None of these prior innovations, moreover, address the general problem of overcoming the problems of noise and low impedance inherent in power lines because of their connection to the power main.

There is thus a need for, and it would be highly advantageous to have, a system which would overcome the above-mentioned disadvantages of presently-available home communication and control systems for communication and control over power lines. This goal is met by the present invention.

SUMMARY OF THE INVENTION

The object of the present invention is to simplify conventional home communication and control system architecture and to improve communication and control by increasing its reliability. The main innovative principle of the invention consists in occasional, relatively short-time disconnections of a local power line from the power main, during which time measurement, communication, and control may take place through the local power line. Even though the local power line will be disconnected from the power main during these time, communication will be over a complete circuit which is maintained by using frequency-dependent elements such as capacitors and inductors, which differentiate between the relatively low-frequency of the electrical power (50 to 60 Hz) and the relatively high-frequency communications carrier (125 to 140 kHz). During the time the local power line is connected to the power main, there is no communication. This arrangement enables a periodic and transient, but simple and reliable, communication between the devices that are connected to an existing or new local power line. It is relatively easy to disconnect a local power line from the power main, and by doing so, the local power line will be isolated from the low impedance and noise sources of the power main. The local power line thus disconnected from the power main will be appropriate for simple and reliable communication. Thus the present invention successfully addresses the problems caused by the low impedance of the power main and the noise and communication interference therefrom.

According to the present invention there is provided a system for communication and control over a local power line, the local power line deriving its power from a power main, the system for communication and control including: (a) at least one transmitter of communication and control signals, having a signal output connected to the local power line; (b) at least one receiver of the communication and control signals, having a signal input connected to the local power line; (c) at least one automatic switch between the local power line and the power main; (d) a mechanism for activating the automatic switch to connect and disconnect the local power line from the power main; and (e) a mechanism for synchronizing the communication and control signals on the local power line so that the communication and control signals are transmitted and received when the local power line is disconnected from the power main.

According to the present invention there is also provided a method for communication and control over a local power line, the local power line deriving its power from a power main, the method for communication and control comprising the steps of: (a) disconnecting the local power line from the power main; (b) transmitting at least one communication and control signal on the local power line; and (c) receiving the communication and control signal from the local power line.

According to further features in preferred embodiments of the invention described below, a transmitter and a receiver can be combined into the same device, so that it can both receive and transmit. Such devices include both a system controller, which monitors and controls the transmission and reception of information on the local power lines as well as information sources. The information sources include sensors and provide information obtained from the sensors to the system controller. The system controller synchronizes the transmission of communication and control signals with the disconnection of the local power line from the power main so that the communication and control signals will be sent over a circuit isolated from the adverse influence of low impedance and noise.

According to still further features in the described preferred embodiments, the system can be used on a local power line which has a relatively low impedance load, and it can also be used on a local power line which has a relatively high impedance load.

In addition, according to the present invention, sensors may be conveniently placed as needed to measure various parameters of interest and communicate them through the local power line. The system controller can likewise be located wherever convenient, and may also include one or more sensors.

In order to maintain a complete circuit for the communication and control signals when the local power line is disconnected from the power main, the present invention provides high-pass filters which constitute a transmission path for the high-frequency communication and control signals while appearing as an open circuit to the low-frequency power when the local power line is connected to the power main. The present invention also makes use of low-pass filters to serve as a transmission path for the low frequency power when the local power line is connected to the power main while appearing as an open circuit to the high-frequency communication and control signals. The present application uses the term "frequency-dependent element" to denote an electrical device whose impedance varies according to the frequency of the voltage or current excitation. Examples of frequency-dependent elements include, but are not limited to, capacitors, inductors, transformers, combinations of capacitors and inductors, crystals, and other resonant devices.

The present application uses the term "power arrangement" to denote a configuration of devices which includes at least one device which outputs electrical power, and which may include any number of devices as loads for this electrical power. The present application uses the term "switchable load" to denote a load of a power arrangement which can be turned on or off, and uses the term "load switch" to denote a switch which turns a switchable on and off Not all loads are switchable. The present application uses the term "current source" to denote an electrical circuit whose output current through a load does not vary significantly as the load impedance is increased from near zero (short circuit) through finite values commonly encountered for such a load.

According to the present invention, there is moreover provided a simple, economical power arrangement which is well-suited for a low-cost system controller, and which includes a current source which provides power for a set of loads which are connected in series. A load may be switched on and off by a control signal which turns a shunting transistor off and on, respectively. The loads of this power supply can include relay coils, triac controls, indicators, integrated circuits, and other devices.

An example of the utility of the present invention is in the control of the temperature of water in a domestic hot water heater. In this case, since an electrical heating element represents a low-impedance load, the system arrangement is as shown in FIG. 1, to which reference is briefly made. Information source 22 contains temperature sensors and monitors and reports on the temperature of the water. System controller 14 periodically interrogates information source 22 to compare the water temperature to certain preset limits. If the water temperature is below the preset minimum, system controller 14 periodically closes automatic switches 24 so that power is applied to the heater, which is load 20. If the water temperature is at or above the maximum, however, system controller 14 keeps the power off by opening automatic switches 24. Note that this use of the present invention is different from that of an ordinary thermostatic control of the hot water temperature by a thermostat built into the water heater, in that the operation of the water heater may be remotely governed without additional wiring by system controller 14, whereas the operation of a conventional built-in thermostat cannot be remotely governed without additional wiring.

Other applications of the present invention include the turning on and off of any load whose operation may be interrupted without detracting from its performance. In addition to temperature control applications as illustrated above, this could include the control of humidity, ventilation, as well as in security and fire-detection applications and other control systems. Sensors and system controllers can be placed virtually anywhere there is an electrical power main, to take advantage of the flexible layout potential offered by such a communication and control system.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system for communication and control which can be used over local power lines. Specifically, the present invention can be used to monitor various conditions and turn on and off various loads for control purposes. For example, it can monitor the temperature of water in a water heater and can turn on and off the water heater to control the temperature of the water. A prominent benefit of a system according to the present invention is its immunity to the noise and signal degradation which arise on account of the power main.

The principles and operation of a system according to the present invention may be better understood with reference to the drawings and the accompanying description.

Figure 1:
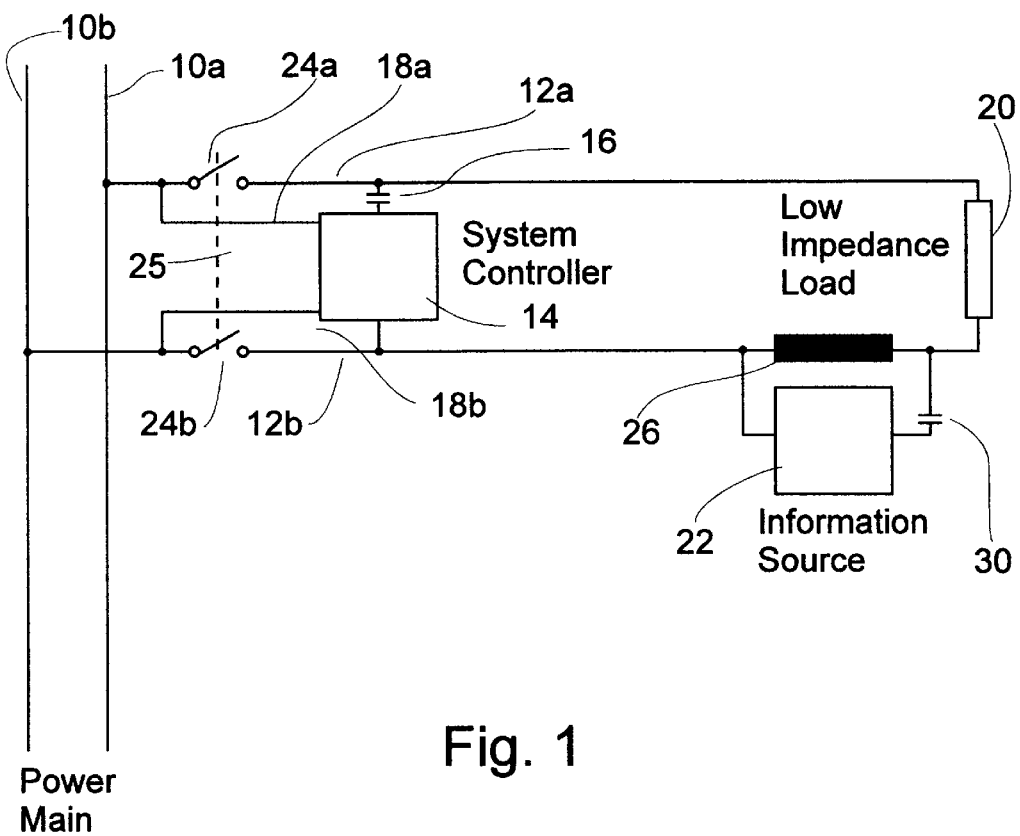
FIG. 1 illustrates a system in the case of a relatively low impedance load.

Referring now to the drawings, FIG. 1 illustrates the arrangement of a system according to the present invention where a load 20 to be controlled has a relatively low impedance. Load 20 receives its power over local power line legs 12A and 12B which are connected to the power main legs 10A and 10B through automatic switches 24A and 24B. The present application uses the term "automatic switch" to denote a means for electrically connecting and disconnecting an electrical line from a power main, implemented in such a way that it may be operated by a mechanism or circuit. Examples of implementing an automatic switch include, but are not limited to, a relay, an electronic device such as a thyristor (for example, a triac, SCR, etc.), a circuit combining a relay and a thyristor, a motorized switch, or other such devices and combinations known in the art. Inductor 26 is provided to transmit the low-frequency electrical power to load 20 by shunting the high-impedance information source 22. Inductor 26, however, will appear as an open circuit to the high-frequency communication and control signals so that they will pass through information source 22. In an alternative embodiment, a transformer could be used in place of inductor 26 in order to galvanically isolate information source 22 from the local power line.

The system controller 14 communicates with the information source 22 over local power line legs 12A and 12B. For example, if load 20 were a water heater, then information source 22 could communicate the temperature of water in the heater to system controller 14 in order to turn the water heater on and off for the purpose of maintaining the water temperature within desirable limits.

System controller 14 derives its own operating power from power main legs 10A and 10B via connections 18A and 18B, so that the power to system controller 14 is not interrupted when automatic switches 24A and 24B are open. In this way, system controller 14 receives operating power continuously. Other embodiments are also possible, where system controller 14 receives its operating power independent of the power main, such as by battery or solar power.

System controller 14 handles the activating of automatic switches 24. When system controller 14 is to communicate with information source 22, it activates automatic switches 24A and 24B via control means 25, thereby disconnecting local power line legs 12A and 12B from power main legs 10A and 10B, and thereby isolating the communication circuit on local power line legs 12A and 12B from the low impedance and noise of power main legs 10A and 10B, and also from interference from similar systems located nearby. System controller 14 also handles synchronizing of all communications, including the transmitting and receiving of communication and control signals, on the communication circuit which includes local power line legs 12A and 12B so that they will occur when the local power lines are disconnected from the power main. It does this by transmitting a command to information source 22 requesting an information update only when the local power line legs 12A and 12B are disconnected from the power main legs 10A and 10B. When it receives a command from system controller 14, information source 22 responds by transmitting the requested information back to system controller 14. In this manner local power line legs 12A and 12B carry the communication and control signals, but they will always do so without the interference and loss of signal strength that accompanies the use of currently-available home communication and control systems on local power lines. System controller 14 can subsequently utilize the information it has received for control purposes. For example, if load 20 were a water heater and information source 22 acted as a thermal monitor, system controller 14 could open or close automatic switches 24A and 24B via lines to maintain the temperature of the water within a desired range.

Figure 2:
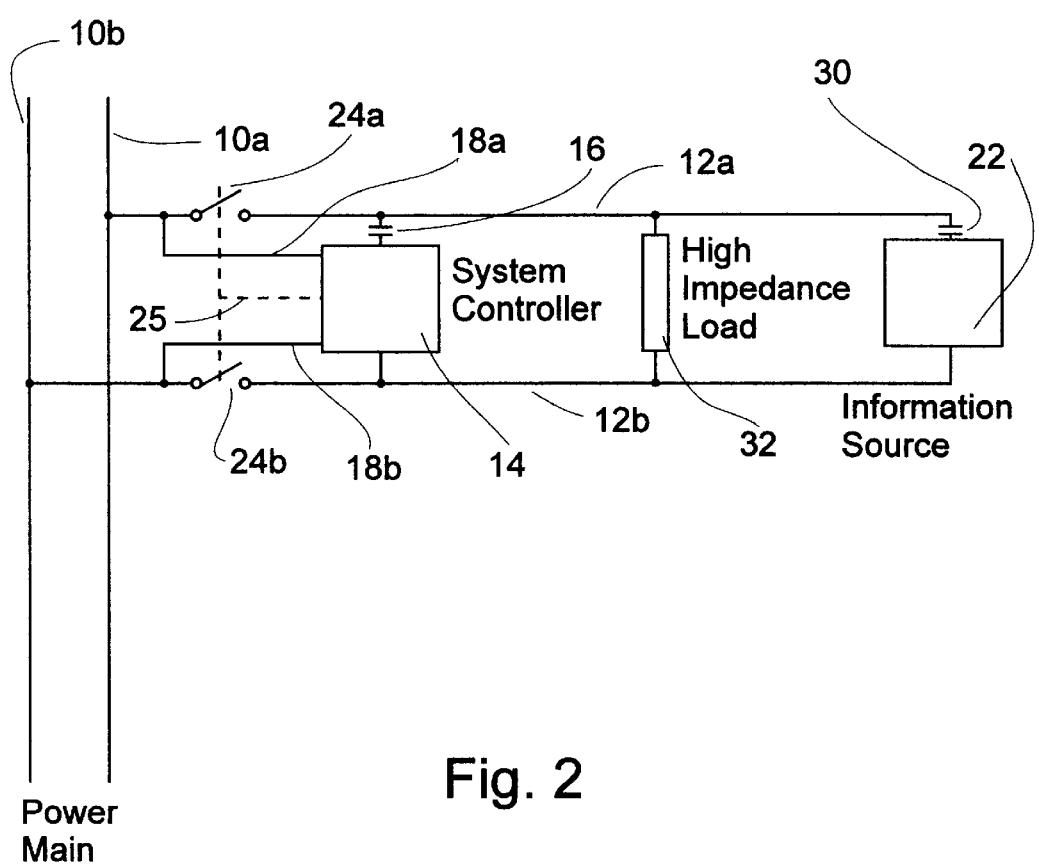
FIG. 2 illustrates a system in the case of a relatively high impedance load.

Another possible configuration is shown in FIG. 2, which illustrates the arrangement of a system according to the present invention where the load 32 to be controlled has a relatively high impedance. The essential difference between this configuration and that illustrated in FIG. 1 is that because of the high impedance of load 32, the signals traveling over the communication circuit are therefore not able to easily pass through load 32, and hence information source 22 must be placed in parallel with load 32. With the exception of the parallel rather than series relationship between information source 22 and load 32, the operation of the configuration illustrated in FIG. 2 is the same as that illustrated in FIG. 1 and described previously.

In order to present a suitably high impedance to avoid a drain of the electrical power, system controller 14 is in series with capacitor 16. Capacitor 30 is placed in series with information source 22. Its operation is the same as that of capacitor 16 but it is associated with information source 22 instead of system controller 14. While capacitors 16 and 30 present a high impedance to the low-frequency power, they present a low impedance to the high-frequency communication and control signals in the communication circuit over the local power line legs 12A and 12B. Capacitor 16 is illustrated herein as external to system controller 14, but in an alternative embodiment may be internal to system controller 14. Likewise, capacitor 30 is illustrated herein as external to information source 22, but in an alternative embodiment may be internal to information source 22. Capacitor 30 is required in the case of a high-impedance load as depicted in FIG. 2, but is optional in the case of a low-impedance load as depicted in FIG. 1 because information source is shunted by inductor 26. For convenience in illustration and example, capacitors are shown where a high-pass filter is needed, and inductors are shown where a low-pass filter is needed. In various embodiments of the present invention, however, a variety of frequency-dependent elements with the appropriate characteristics may be used to block or transmit either the low-frequency power or the high-frequency communication and control signals. In particular, combinations of capacitors and inductors may be used to improve the selectivity of a filter, as is known in the art.

Figure 3:
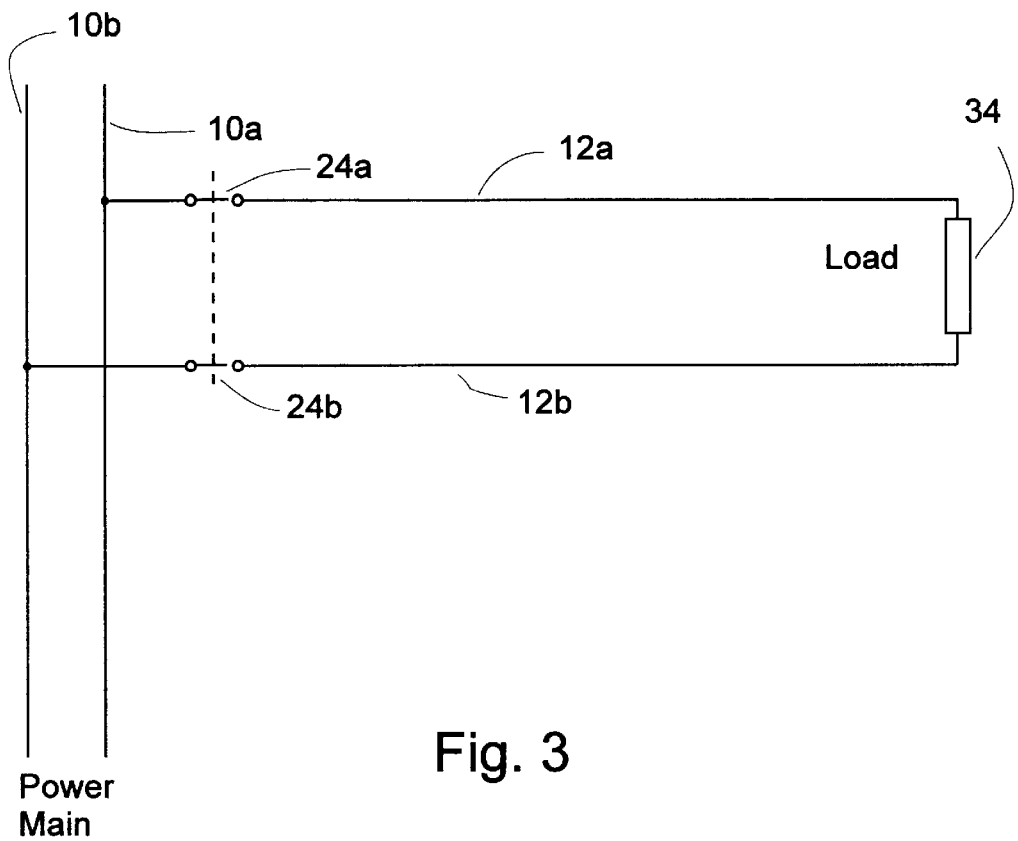
FIG. 3 shows the equivalent circuit for power transmission when the automatic switch is closed.
Figure 4:
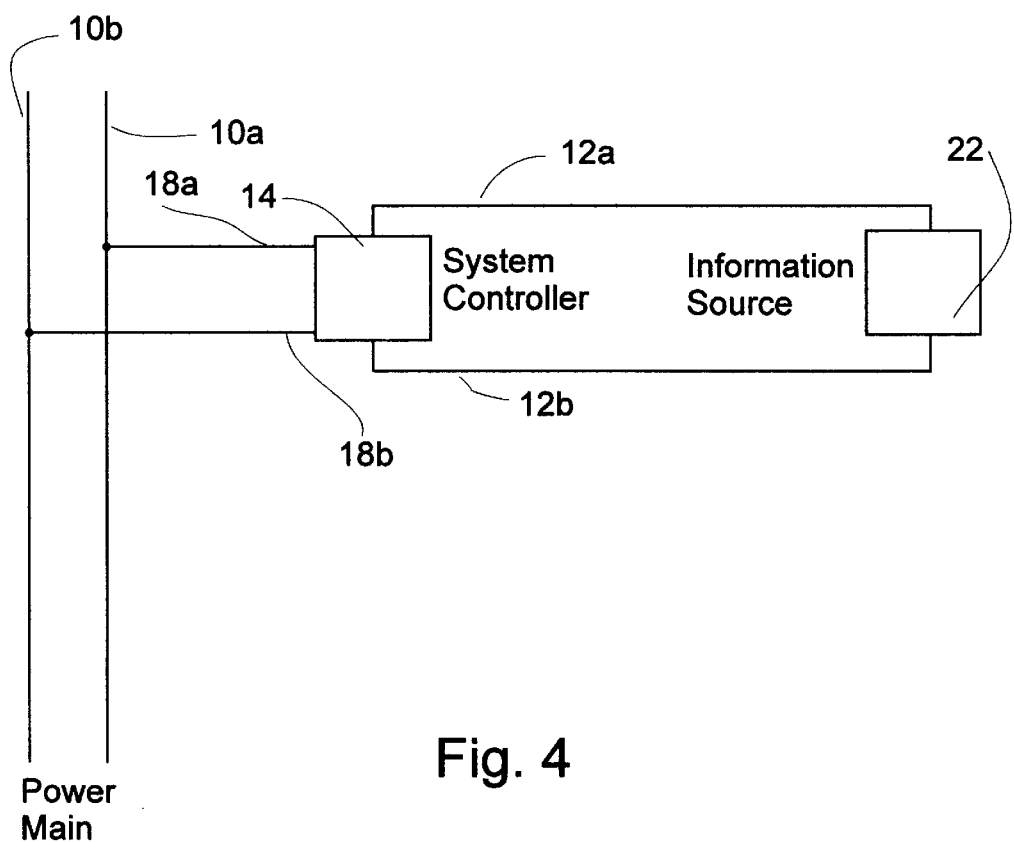
FIG. 4 shows the equivalent circuit for signal communication when the automatic switch is open.

The communication signals between system controller 14 and information source 22 are superimposed as a modulation on a carrier frequency which is much higher than the AC frequency of the electric power. Any simple encoding method, such as amplitude modulation, frequency modulation, or pulse width modulation, may be employed. The use of a higher frequency for signals allows them to be routed differently on the communication circuit by frequency-dependent elements, such as capacitors and inductors. FIG. 3 shows an equivalent circuit for power transmission, when automatic switches 24A and 24B are closed. The low-frequency electrical power sees capacitor 16 and capacitor 30 as open circuits, and inductor 26 as a short circuit, so that only load 34 appears in the equivalent circuit for power transmission. In this circuit, load 34 can be either the low-impedance load 20 of FIG. 1 or the high-impedance load 32 of FIG. 2. FIG. 4, however, shows an equivalent circuit for the communication and control signals, when automatic switches 24A and 24B are open. The high-frequency communication and control signals see capacitor 16 and capacitor 30 as short circuits, and inductor 26 as an open circuit. The high-frequency communication and control signals also see load 20 as a short circuit and load 32 as an open circuit, so that when automatic switches 24A and 24B are open the communication circuit is a simple transmission path formed by local power line legs 12A and 12B.

Because load 20 has relatively low impedance (FIG. 1), the signals traveling over the communication circuit can easily pass through load 20. In this case, therefore, information source 22 is placed in series with load 20. The low-frequency electrical power to load 20 is shunted across information source 22 by inductor 26. Although inductor 26 presents a low impedance to the low-frequency electrical power, it presents a high impedance to the high-frequency communication and control signals.

Because load 32 has relatively high impedance (FIG. 2), the signals traveling over the communication circuit cannot easily pass through load 32. In this case, therefore, information source 22 is placed in parallel with load 32. The low-frequency electrical power to load 32 is isolated from information source 22 by capacitor 30. Although capacitor 30 presents a high impedance to the low-frequency electrical power, it presents a low impedance to the high-frequency communication and control signals.

Figure 5:
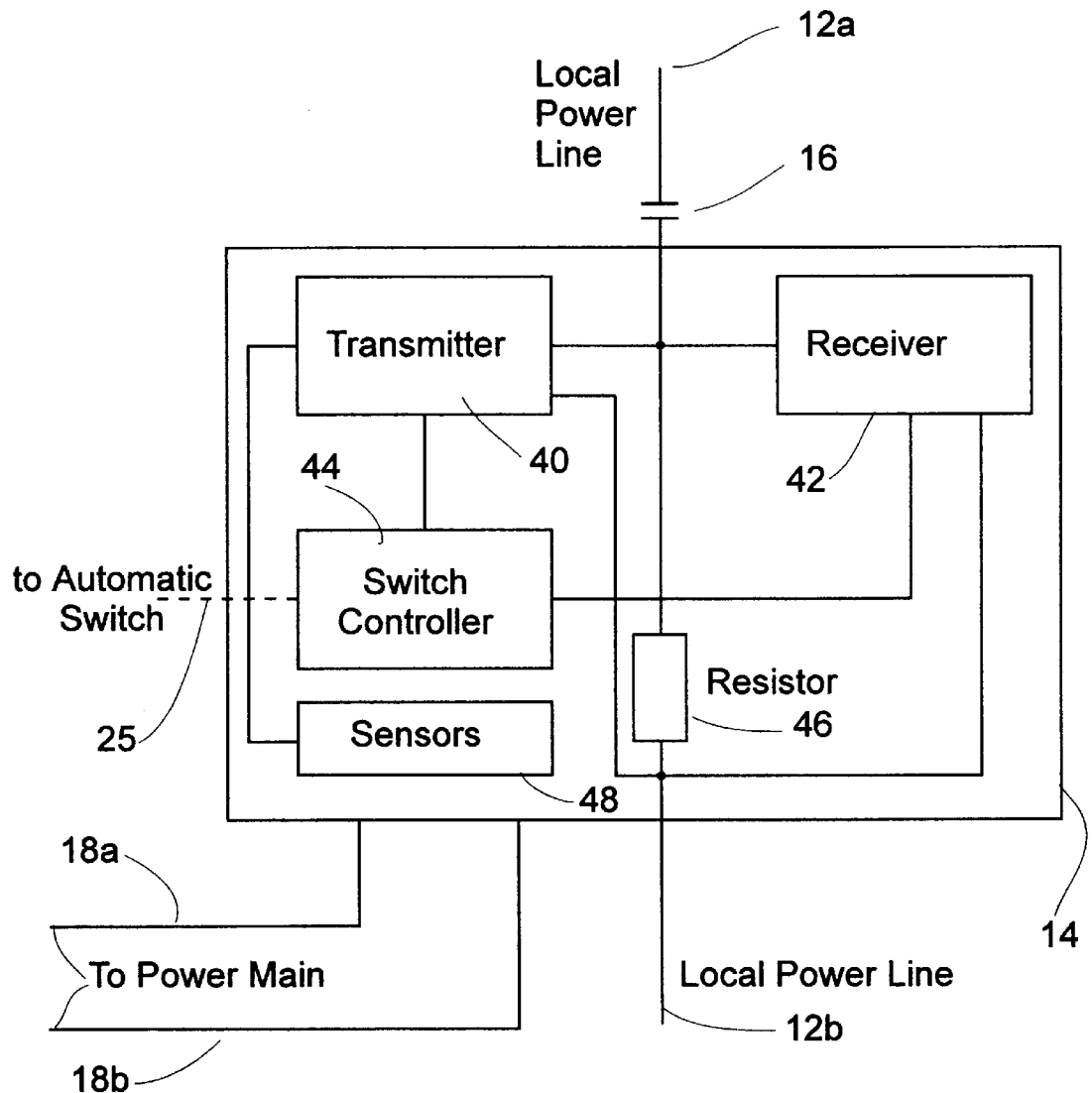
FIG. 5 is a block diagram of the system controller.

FIG. 5 is a block diagram of system controller 14 according to the present invention. As illustrated here, system controller 14 derives its operating power directly from connections 18A and 18B which are direct to the power main legs. System controller 14 output is connected directly to local power line leg 12B and indirectly to local power line leg 12A through capacitor 16, which is in series with resistor 46, across which the output of transmitter 40 and the input of receiver 42 are connected. In this way, transmitter 40 can output signals which will appear on the local power line and which can be detected by other devices connected thereto, and receiver 42 can detect signals sent by other communicating devices connected to the local power line; such signals appear as signal outputs from transmitters such as transmitter 40 and as signal inputs to receivers such as receiver 42. When system controller 14 is to transmit or receive signals, switch controller 44 opens the automatic switches via activating means 25 to disconnect the local power line from the power main to eliminate the problems caused by low impedance and noise, and thereby improve the transmission and reception. Since system controller 14 governs the opening of the automatic switches, system controller 14 is responsible for synchronizing all communication over the communication circuit. System controller 14 does this by sending command signals to the other communicating devices connected to the local power lines. Upon receiving a command signal, another device will respond by sending its own transmission within a specified period of time, during which the automatic switches will still be open. Thus, all transmissions will be conducted without interference from the low impedance and noise of the power main. In addition to the above components, the system controller can also include optional local sensors 48 for detecting conditions of the local environment.

Figure 6:
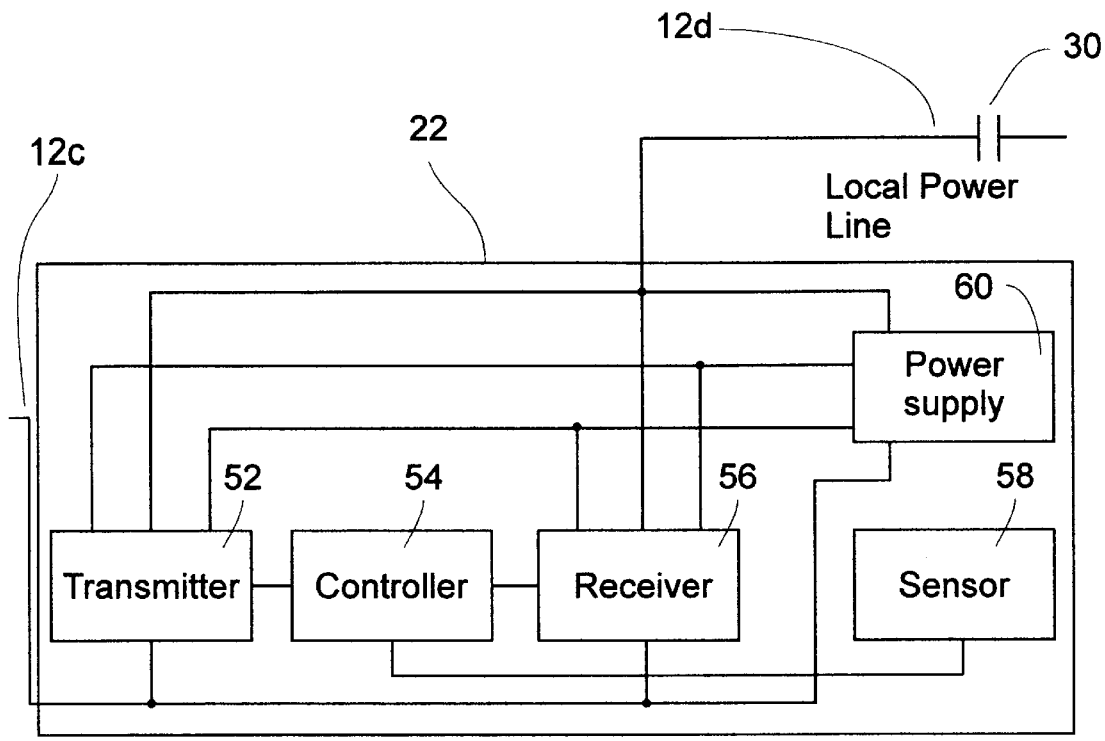
FIG. 6 is a block diagram of the information source.

FIG. 6 is a block diagram of information source 22 according to the present invention. As illustrated here, it contains a transmitter 52 and a receiver 56, which are connected to different legs of the local power line, 12C and 12D. These two different power line legs 12C and 12D may be one side of the leg 12B which has been broken by the insertion of inductor 16, as illustrated in FIG. 1, or they may be the two different legs of the local power line, 12A and 12B, separated by capacitor 30, as also illustrated in FIG. 2. In this way, transmitter 52 can output signals which will appear on the local power lines and which can be detected by other devices connected thereto, and receiver 56 can detect signals sent by other communicating devices connected to the local power line. Controller 54 responds to command signals received from the system controller by receiver 56. When information source 22 has been instructed to transmit information, controller 54 takes data gathered by sensors 58 and transmits them onto the local power line by transmitter 52. During the time of receiving and transmitting over the communication circuit, the local power line is temporarily and briefly disconnected from the power main to eliminate the problem of low impedance and noise. To provide uninterrupted power during these periods of disconnection, power supply 60 stores electrical energy and thereby provides electrical power to operate transmitter 52 and receiver 56 during these short-term periods. In one embodiment, power supply 60 derives its energy from the electrical signals of the communication. This is possible because the low impedance of the power main has been disconnected and all the energy of the communication can be available for power, using well-known methods.

In an embodiment of the present invention used to control water temperature, system controller 14 can be provided with three push-button switches for selecting "reset", "medium hot water", and "hot water." Pushing the "medium hot water" button sets the preset temperature which would provide sufficient hot water in a regular domestic hot water heater to enable a person to take a comfortable shower. Pushing the "hot water" button sets the preset temperature which would provide sufficient hot water for several persons. Pushing the "reset" button cancels the preset temperature and turns off the heater if the heater is on. System controller 14 can also be provided with three indicators corresponding to the push buttons. The present application uses the term "indicator" to denote any device which makes a perceptible notification of a given condition. Indicators include, but are not limited to, visual and audible signaling devices such as lights and audible alarms. In the case of system controller 14, LED's may be used as indicators. The "reset" LED would glow steadily when the water temperature in the heater is below either preset limit. The other LED's would flash to show that their corresponding preset temperature had been selected and that the water is being heated, and they would glow continuously when the selected preset temperature had been reached. The operational modes of such a system include a "manual" mode, in which system controller 14 interrogates information source 22 and powers the heater element as needed to attain the selected preset temperature. In the "manual" mode, the system resets itself once the selected preset temperature is reached. There is also an "automatic" mode, in which system controller 14 continually interrogates information source 22 and powers the heater element as needed to continually maintain the selected preset minimum temperature. These modes could be selected by a switch on system controller 14. In addition to these modes, an embodiment of system controller 14 could include an "anti-freezing" protection, whereby system controller 14 would not allow the temperature of the water in the heater to drop below the freezing point even when system controller 14 was reset.

Figure 7:
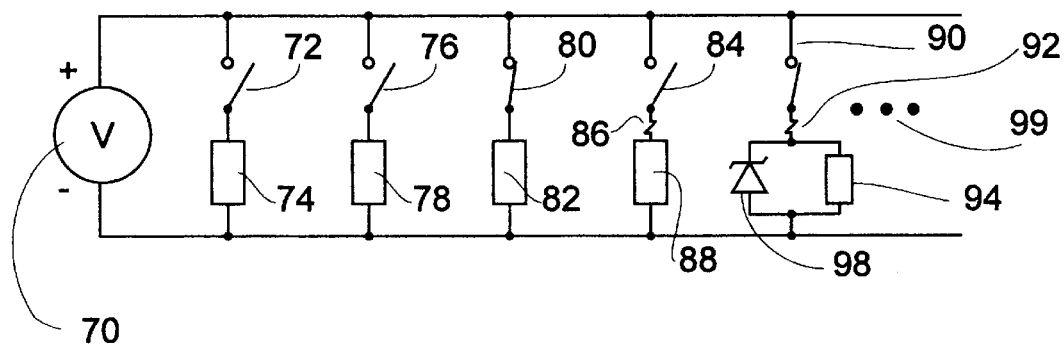
FIG. 7 is a block diagram of a prior art power arrangement utilizing a voltage source to power the loads.

As previously mentioned, the present invention moreover provides a simple, economical power arrangement which is well-suited for implementing system controller 14 (FIG. 5) according to the design goals of the present invention. FIG. 7 illustrates a prior art power arrangement utilizing a voltage source 70 for a power supply. When a power supply is designed to output a constant voltage (a "voltage source"), the different switchable s, shown as 74, 78, 82, 86, and 94, are connected in parallel, each load being placed across the output voltage and switched separately with switches 72, 76, 80, 84, and 90, each switch placed in series with its respective load. In FIG. 7 loads 74, 78, and 82 are shown as operating from the constant voltage of the voltage source 70, whereas load 88 is shown as requiring a current input, and is therefore connected in series with resistor 86. Load 94, on the other hand, is shown as needing a lower voltage than that of voltage source 70, so it is placed in parallel with zener diode 98 through resistor 92. Switches 80 and 90 are closed to force current through their respective loads 82 and 94, whereas the others are open, leaving their respective loads off. This illustrates how different load requirements can be met with this prior art power arrangement. The ellipsis ( . . . ) indicates that more switchable s may be added by wiring them in parallel.

The disadvantage of the voltage source power arrangement illustrated in FIG. 7 is that the current output required of the voltage source power supply 70 will increase as more loads are switched in, and this creates difficulties and leads to inefficient, expensive design that increases the cost and bulk of home communication and control system devices.

Figure 8:
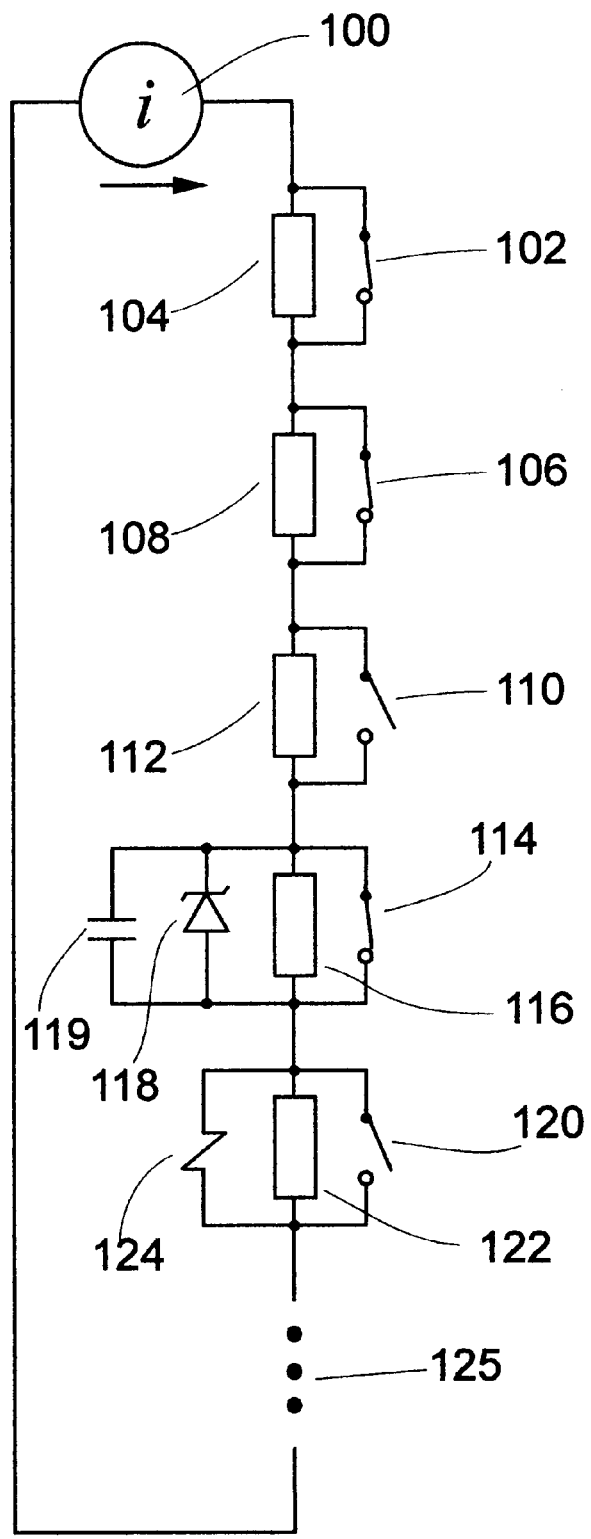
FIG. 8 is a block diagram of a power arrangement according to the present invention, utilizing a current source to power a set of loads.

It is well-known in the art, however, that providing and handling an increasingly large voltage is less difficult than providing and handling an increasingly large current. Consequently, FIG. 8 illustrates the power arrangement according to the present invention, which utilizes a current source 100, with which the different loads 104, 108, 112, 116, and 122 are placed in series. Here, each load carries the current to the next and is switched separately with switches 102, 106, 110, 114, and 120, each switch placed in parallel with its respective load. In this innovative arrangement, a switchable is turned on or off by opening or closing, respectively, a load switch which shunts the current around it. The present application uses the term "automatic shunt" to denote a shunt which may be closed by electrical action so that it carries current, or opened by electrical action so that it does not carry current. Various embodiments of automatic shunts include, but are not limited to, circuits utilizing transistors, relays, and thyristors. In this fashion, the current from current source 100 stays the same as the loads are turned on and off; only the voltage varies, greatly simplifying the design of the power supply. In FIG. 8 loads 104, 108, and 112 are shown as operating from the constant current of the current source 100, whereas load 116 is shown as requiring a voltage input, and is therefore connected in parallel with zener diode 118 and filtering capacitor 119. Load 122, on the other hand, is shown as needing a lower current than that of current source 100, so it is placed in parallel with resistor 124. Switches 110 and 120 are open to force current through their respective loads 112 and 122, whereas the others are closed, leaving their respective loads off. This illustrates how different load requirements can be met with this power arrangement according to the present invention. The ellipsis ( . . . ) indicates that more switchable s may be added by wiring them in series.

Figure 9:
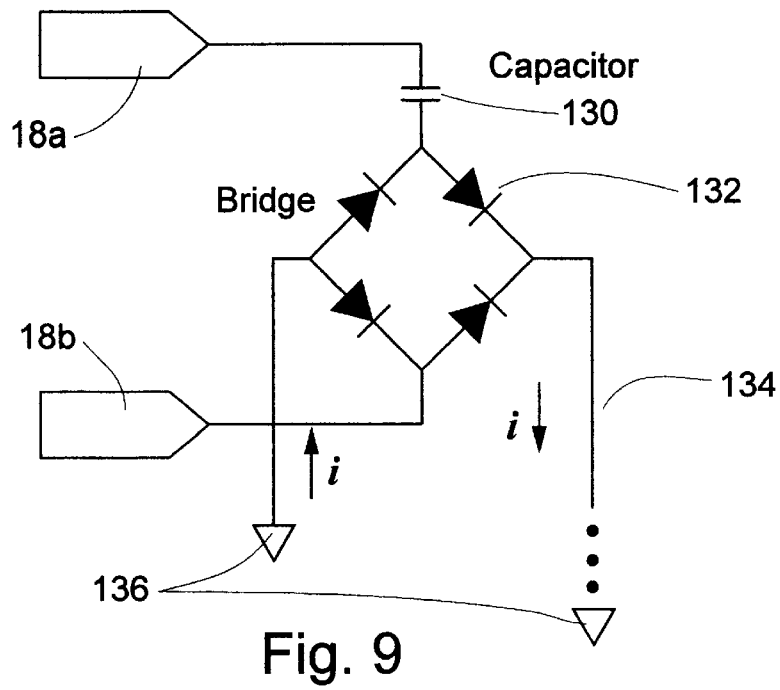
FIG. 9 is a circuit diagram for a current source utilizing a capacitor.

FIG. 9 illustrates an embodiment of a current source power supply for a power arrangement according to the present invention. The source of electrical power is the connections 18A and 18B to the AC power main. It is the reactance of capacitor 130 which provides a relatively constant alternating current, which is full-wave rectified by bridge 132. The current travels through a loop formed by ground connection 136 and leg 134. The ellipsis ( . . . ) indicates that leg 134 completes the current circuit by continuing on to ground connection 136, possibly through one or more loads connected in series, possibly including one or more switchable s. As an example of the current sourced by this arrangement, consider a common power main voltage of V=110 volts AC (RMS) at a frequency $f$=60 Hz and a small capacitor of C=0.022 $\mu$F. The RMS current will be equal to the product of the RMS voltage, the capacitance, and the angular frequency ($\omega$=2$\pi f$): i=2$\pi f$VC, which for this example will be in the range of 1 milliampere AC RMS.

Figure 10:
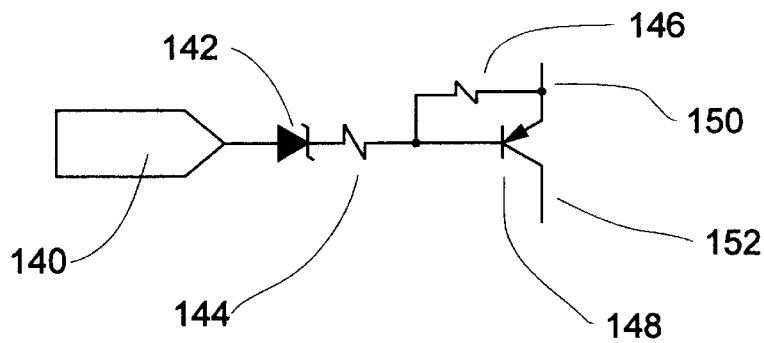
FIG. 10 is a circuit diagram for a load switch utilizing a zener diode and a transistor.

FIG. 10 is a schematic of an innovative load switch utilizing a transistor 148 as an automatic shunt, a resistor network consisting of resistor 144 and resistor 146, and a zener diode 142. Transistor 148 is controlled by input 140. When transistor 148 is off, current flows through the switchable connected in parallel across points 150 and 152, thereby turning on the switchable. When transistor 148 is on, however, it shunts current around the switchable connected in parallel across points 150 and 152, thereby turning off the switchable.

Figure 11:
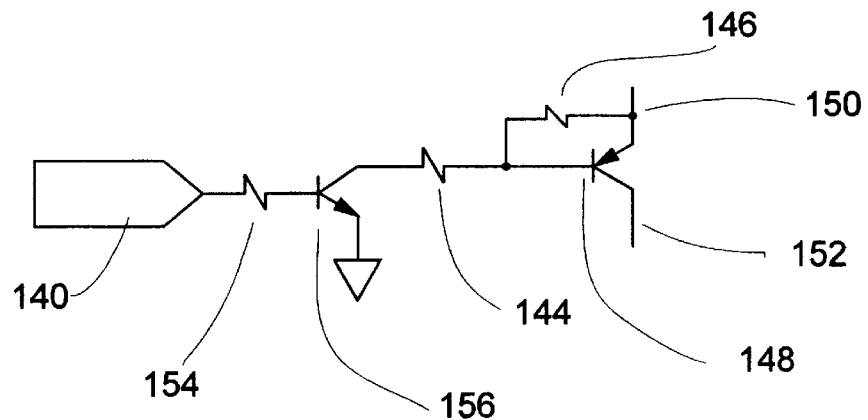
FIG. 11 is a circuit diagram for a load switch using two transistors.

FIG. 11 is a schematic of a load switch similar in operation to that shown in FIG. 10, utilizing a transistor 156 in place of zener diode 142.

Figure 12:
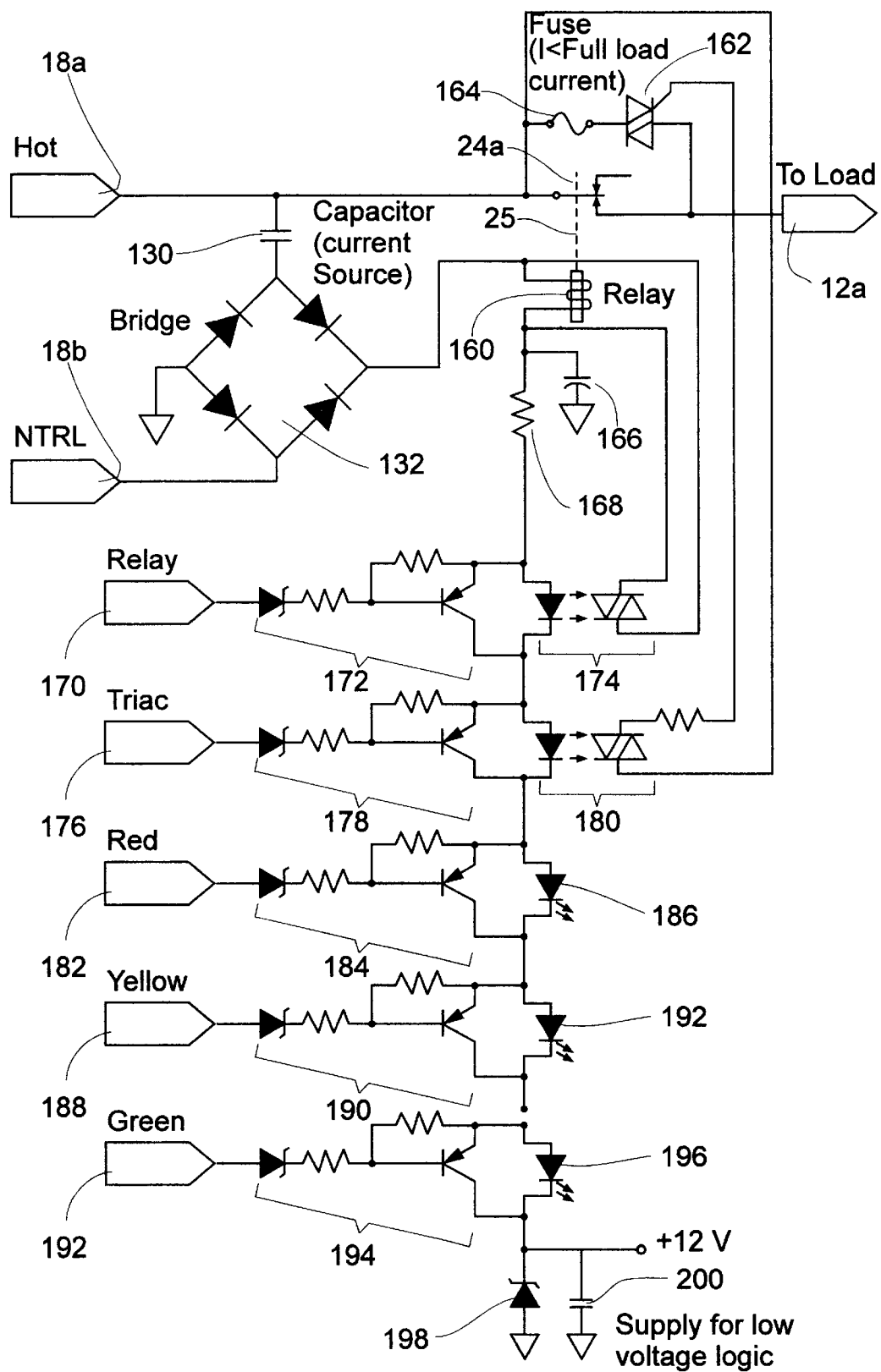
FIG. 12 is a circuit diagram for a complete power arrangement for a system controller according to the present invention.

FIG. 12 is a circuit diagram of a simple, versatile, and low-cost power arrangement for the system controller. The power arrangement according to the present invention has the advantages of simplicity, low cost, and improved operational efficiency when compared to presently-available power arrangements, which feature voltage sources to power a number of different switchable s.

As illustrated in FIG. 12, the power arrangement of the present invention is connected to the power main via connections 18A (hot) and line 18B (neutral). The capacitor 130 provides a current source as discussed above, which is full-wave rectified by bridge 132. The switchable s of this power arrangement are indicated by circuits 172, 178, 184, 190, and 194, which are controlled by inputs 170, 176, 182, 188, and 192 to act as automatic shunts for loads 174, 180, 186, 192, and 196, respectively. Loads 172 and 178 feature optically-coupled triacs 174 and 180, respectively, which control relay coil 160 and triac 162, respectively. Relay coil 160 effects a magnetic coupling that implements control means 25 to operate relay contacts which implement automatic switch 24A to connect and disconnect local power line leg 12A from the power main via connection 18A. Triac 162 in series with slow-blowing fuse 164 serves to protect the relay contacts of automatic switch 24A from arcing when they are opened or closed. Triac 162 is turned on briefly before the relay contacts of automatic switch 24A are switched, and remains on briefly afterwards, thereby shunting any current around contacts while they are in transition. When the contacts are closed and conducting current, triac 162 is not needed and may be turned off Switchable s 186, 192, and 196 are LED's which function as indicators. In addition to the switchable s indicated above, there is a load without an automatic shunt, consisting of zener diode 198 with filter capacitor 200 to provide low-voltage DC.

While the invention has been described with respect to a limited number of embodiments, it will be appreciated that many variations, modifications and other applications of the invention may be made.

What is claimed is:

1. A system for communication and control over a local power line, the local power line deriving its power from a power main, the system for communication and control comprising:

(a) at least one transmitter of communication and control signals, having a signal output connected to said local power line;

(b) at least one receiver of said communication and control signals, having a signal input connected to said local power line;

(c) at least one automatic switch between said local power line and said power main;

(d) a mechanism for activating said at least one automatic switch to connect and disconnect said local power line from said power main; and (e) a mechanism for synchronizing said communication and control signals on said local power line so that said communication and control signals are transmitted and received when said local power line is disconnected from said power main.

2. The system as in claim 1, further comprising:

(f) at least one sensor.

3. The system as in claim 2, wherein said at least one sensor comprises a transducer of a physically measurable quantity selected from the group consisting of temperature, light, humidity, magnetic field, pressure, fluid flow, sound, pH, smoke density, and radioactivity.

4. The system as in claim 1, further comprising:

(f) at least one electrical load.

5. The system as in claim 4, wherein said at least one electrical load comprises apparatus selected from the group consisting of water heaters, lighting, space heaters, ventilators, air conditioners, humidifiers, dehumidifiers, home appliances, and security systems.

6. The system as in claim 1, wherein said transmitter of said communication and control signals and said receiver of said communication and control signals are combined within a single device.

7. The system as in claim 6, wherein said single device includes at least one sensor.

8. The system as in claim 1, wherein said transmitter is connected to said local power line in series with a high-pass filter.

9. The system as in claim 8, wherein said high-pass filter is a capacitor.

10. The system as in claim 1, wherein said receiver is connected to said local power line in series with a high-pass filter.

11. The system as in claim 10, wherein said high-pass filter is a capacitor.

12. The system as in claim 1, wherein said transmitter is connected to said local power line in parallel with a low-pass filter.

13. The system as in claim 12, wherein said low-pass filter is an inductor.

14. The system as in claim 1, wherein said receiver is connected to said local power line in parallel with a low-pass filter.

15. The system as in claim 14, wherein said low-pass filter is an inductor.

16. A method for communication and control over a local power line, the local power line deriving its power from a power main, the method comprising the steps of:

(a) disconnecting the local power line from the power main;

(b) transmitting at least one communication and control signal on the local power line; and (c) receiving said at least one communication and control signal from the local power line.

* * * * *